United States Patent [19]

Menke et al.

[11] 3,955,860

[45] May 11, 1976

[54] JOURNAL BEARING

[75] Inventors: John R. Menke; Gilbert F. Boeker, both of New York, N.Y.

[73] Assignee: The United States of America as represented by the United States Energy Research and Development Administration, Washington, D.C.

[22] Filed: Feb. 7, 1949

[21] Appl. No.: 75,067

[52] U.S. Cl................................ 308/134.1; 308/9; 308/121
[51] Int. Cl.² ........................................... F16C 1/24
[58] Field of Search ........ 308/121, 127, 133, 134.1, 308/9

[56] References Cited
UNITED STATES PATENTS

| | | | |
|---|---|---|---|
| 1,508,085 | 9/1924 | Cooper | 308/127 |
| 1,923,597 | 8/1933 | Walker | 308/121 |

FOREIGN PATENTS OR APPLICATIONS

| | | | |
|---|---|---|---|
| 181,629 | 6/1922 | United Kingdom | 308/127 |
| 786,915 | 6/1935 | France | 308/127 |

OTHER PUBLICATIONS
Gen. Elec. Co. 380,660 Sept. 22, 1932.

*Primary Examiner*—Samuel Feinberg
*Attorney, Agent, or Firm*—Dean E. Carlson; Leonard Belkin

EXEMPLARY CLAIM

1. An improved journal bearing comprising in combination a non-rotatable cylindrical bearing member having a first bearing surface, a rotatable cylindrical bearing member having a confronting second bearing surface having a plurality of bearing elements, a source of lubricant adjacent said bearing elements for supplying lubricant thereto, each bearing element consisting of a pair of elongated relatively shallowly depressed surfaces lying in a cylindrical surface co-axial with the non-depressed surface and diverging from one another in the direction of rotation and obliquely arranged with respect to the axis of rotation of said rotatable member to cause a flow of lubricant longitudinally along said depressed surfaces from their distal ends toward their proximal ends as said bearing members are rotated relative to one another, each depressed surface subtending a radial angle of less than 360°, and means for rotating said rotatable bearing member to cause the lubricant to flow across and along said depressed surfaces, the flow of lubricant being impeded by the non-depressed portions of said second bearing surface to cause an increase in the lubricant pressure.

5 Claims, 5 Drawing Figures

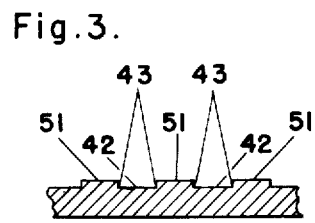
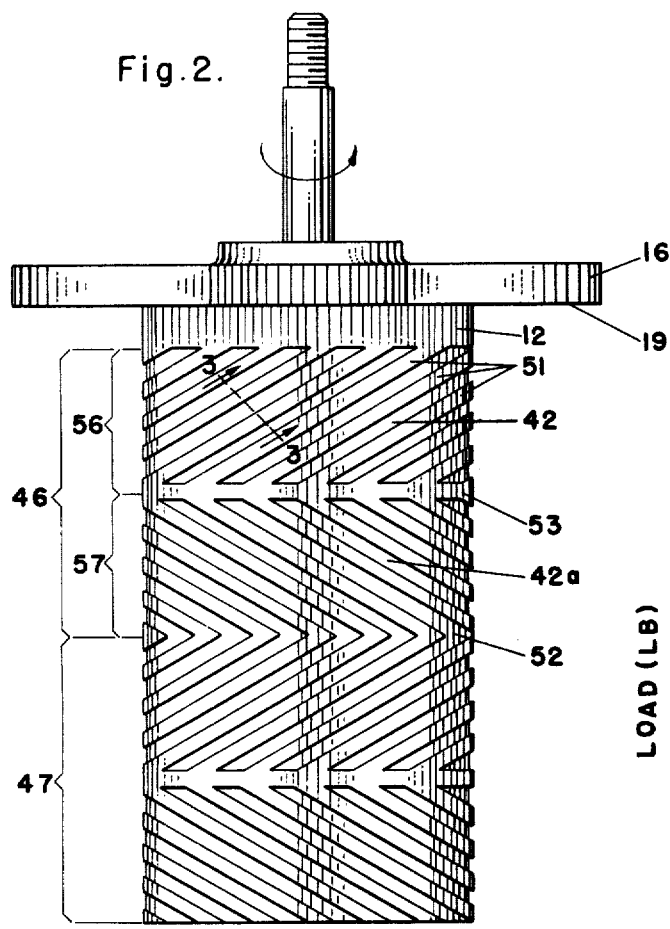
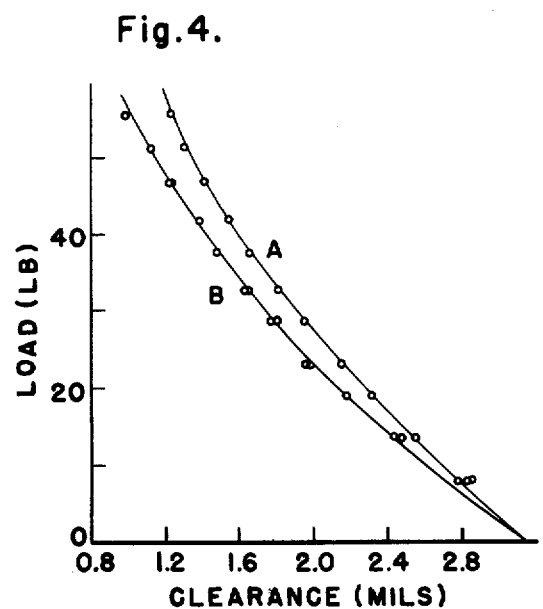
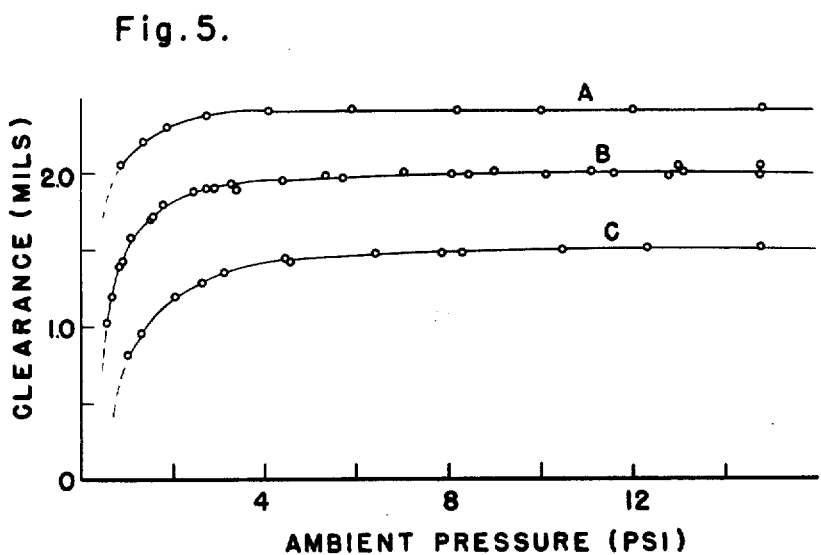
INVENTORS.
JOHN R. MENKE
GILBERT F. BOEKER
BY

JOURNAL BEARING

This invention relates to a journal bearing particularly suited to the use of gaseous lubricants and more particularly the invention is concerned with a journal bearing whose confronting surfaces incorporate a novel structure designed to improve the load-carrying capacity and stability of the bearings.

Conventionally lubricated bearings are subject to a number of disadvantages and limitations. For example, in cases where a bearing is contained in a pump or compressor handling a corrosive gas, the corrosive gas often reacts chemically with the lubricant and destroys its lubricating properties. A further disadvantage of conventional lubricants is that the gas handled by the pump may become contaminated either with the lubricant or with the products of the reaction between the corrosive gas and the lubricant. On the other hand, if the corrosive gas being handled by the pump is itself to be used as the lubricant, both of these difficulties can be readily overcome.

Another important factor in choosing a lubricant is the effect of the lubricant in reducing the friction between the confronting bearing surfaces. An important advantage of gaseous lubricants is that the frictional effects are considerably reduced when compared to the frictional effects of liquid or solid lubricants. This, of course, is the result of the relatively low viscosity of gases. The power saving derived from the use of gaseous lubricants may often be as high as 99% for the same bearing area.

These clear advantages, though of primary consideration, have not led to a wide utilization of gas-lubricated bearings. Until just a short time ago, the industrial usage of gas-lubricated bearings was quite rare, since it was thought that such bearings could not support a sufficiently large load to be used successfully.

Recently, however, a number of successful thrust bearings suited for gaseous lubricants have been developed. Most of these gas-lubricated thrust bearings are based on the action of especially fabricated bearing surfaces which act to pump the lubricant from the outer periphery of the bearing inward toward the rotating shaft. The pressure of the lubricant is increased sufficiently by this pumping action to support and lubricate a rotor having a considerable mass. A typical thrust bearing of this type is disclosed in the co-pending application of John R. Dunning et al., Ser. No. 683,872, filed July 16, 1946. The thrust bearing disclosed in that application comprises a first bearing member having a plane bearing surface and a second bearing member having a confronting bearing surface provided with a plurality of spiral grooves extending inwardly in the direction of rotation from the periphery of the bearing surface where there is a source of lubricant. Rotation of one of the bearing members relative to the other causes the lubricant to be drawn into the spiral grooves. The pressure of the lubricant is increased in the spiral grooves and the lubricant flows out between the bearing surfaces under sufficiently high pressure to support the rotating bearing member and thus the rotor of the machine to which it is fixed.

A further problem arises in gas-lubricated journal bearings, particularly those to be used with a vertical shaft. Usually, in a journal bearing carrying a load, the axis of the journal is not co-linear with the axis of the bearing sleeve. As the speed of the journal is increased a speed of rotation, sometimes called threshold speed, is reached at which the axis of the journal begins to rotate about the axis of the sleeve. This phenomenon is usually termed "whip". As the speed of rotation is increased still further, the displacement of the journal axis from the sleeve axis may become so large and the whipping so violent that the journal surface makes contact with the confronting sleeve surface. This is particularly true when the bearing is only lightly loaded and as the load is decreased toward zero at any particular speed, the violence of the whipping increases. Also, the amplitude of the displacement of the journal axis from the bearing sleeve axis increases as the speed of rotation increases. This phenomenon then places a severe limitation on the speed at which gas-lubricated journal bearings may be run and on the load they may carry.

Accordingly, it is an object of this invention to provide a journal bearing having little tendency to whip even at very high speeds of rotation of the journal.

Another object of the invention is to provide an improved journal bearing of high stability particularly suited for use with a gaseous lubricant.

A further object of the invention is to provide an improved journal bearing useful in a vertical position where conventional liquid or solid lubricants cannot be used.

A still further object is to provide a journal bearing having a high load-carrying capacity at high speeds of rotation even when lubricated with a gas.

Other objects of this invention will be in part obvious and in part pointed out hereinafter.

Many advantages and modifications of the present invention will become apparent in the following description wherein reference is made to the accompanying drawings. In these, the invention is shown embodied in a substantially enclosed motor-driven centrifugal compressor unit employing a motor of the type wherein the rotor surrounds the motorstator. In the drawings:

FIG. 2 is an elevation of the shaft shown in FIG. 1 and illustrates a journal surface in accordance with the invention.

FIG. 3 is a developed cross section of a portion of the shaft taken on the line 3—3 of FIG. 2.

FIG. 4 is a curve showing the relation between the load carried by an embodiment of the bearing and the minimum clearance between the journal surface and the confronting surface of the bearing sleeve at two different speeds.

FIG. 5 is a curve showing the relation for a particular embodiment of the invention between the ambient pressure of the gaseous lubricant and the minimum clearance which is maintained between the bearing surfaces at various loads placed on the rotor.

Figure 1:
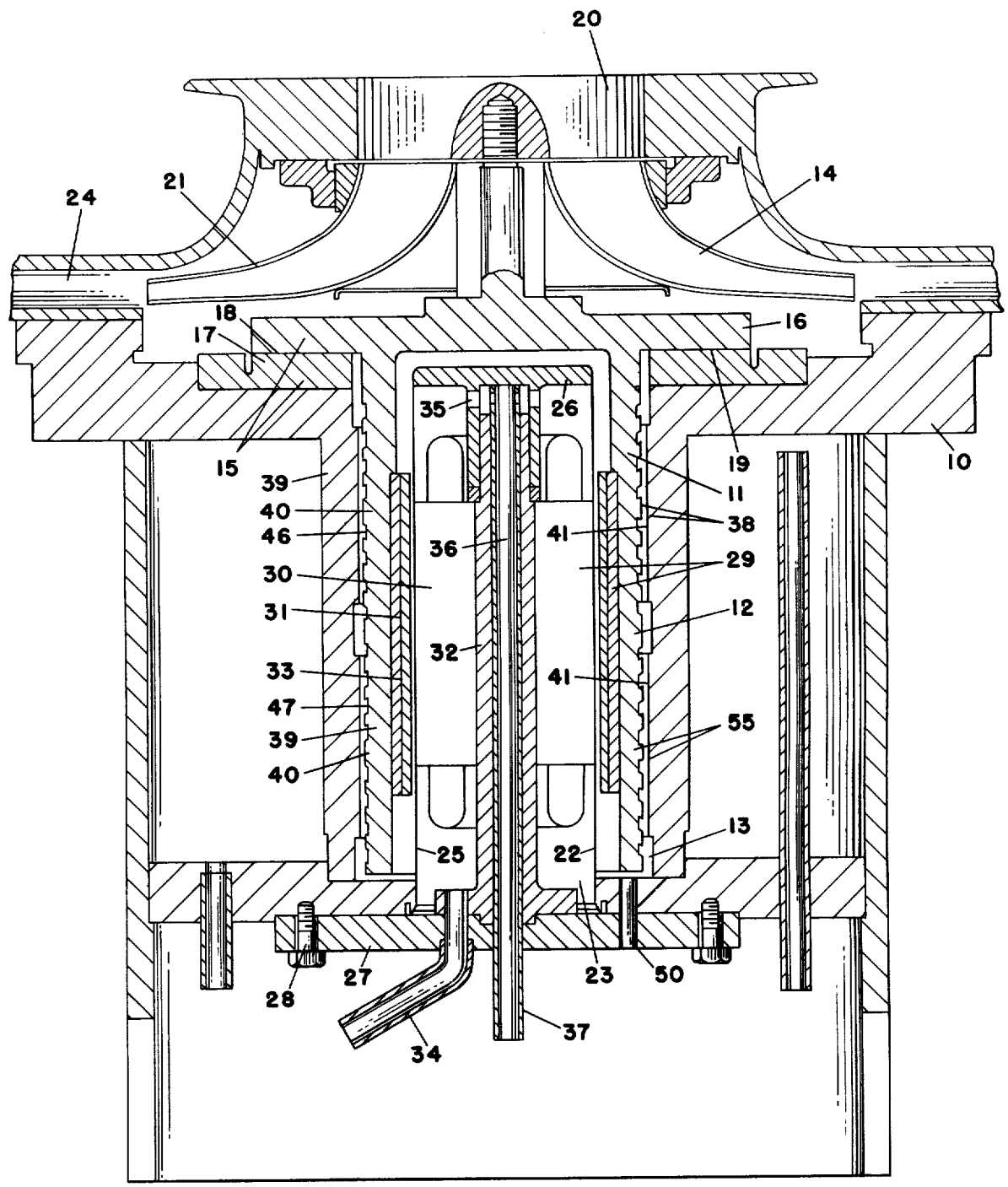
FIG. 1 is a vertical axial section of such a motor-driven centrifugal compressor including two journal bearings fabricated in accordance with the present invention.

It will be observed that in the following discussion reference is made only to the use of gaseous lubricants. It will become evident, however, as the description proceeds, that liquid lubricants may also be used advantageously with the bearing provided by the present invention.

Referring to the drawings and particularly to FIG. 1, there is shown a substantially enclosed motor-blower unit comprising a sealed casing 10 and a rotor 11 adapted to rotate about a vertical axis. Rotor 11 comprises a hollow open-ended shaft 12 situated in a central cavity or well 13 and a pump impeller 14 situated in the upper part of the casing.

The vertical thrust of the rotor 11 is carried by a thrust bearing 15 of which the thrust collar 16 is integral with the shaft for rotation. Cooperating with the thrust collar 16 is the thrust plate 17 fixed to the casing 10. The upper surface 18 of the thrust plate 17 may have spiral grooves as disclosed in the Dunning et al. application referred to, while the lower surface 19 of the thrust collar 16 may be a plane surface.

The gas to be pumped is drawn into the casing through a central flanged inlet 20 and flows through the vanes 21 of the impeller 14 into a discharge passage 24. The impeller 14 and the discharge passage 24 cooperate to compress and pump the gas flowing therethrough.

The bottom of the well 13 has a re-entrant wall 22 which forms a central enclosure 23 within the open end of the hollow shaft 12. The re-entrant wall comprises a thin cylindrical diaphragm 25 which is sealed at its lower end to the bottom of the well 13 and a disc 26 to which the upper end of the diaphragm is sealed. The enclosure 23 is closed at its lower end by a block 27 secured in substantially fluid-tight relation to the base of the casing, as by bolts 28.

The rotor 11 is driven by means of a motor 29 comprising a motor-stator 30 mounted within the central enclosure 23 and a motor-rotor 31 mounted on the inside surface of the hollow rotor shaft 12. (The terms motor-rotor and motor-stator are used to designate the electrically active rotating and stationary portions, respectively, of the motor.) The motor-stator 30 is supported on a centrally located hollow column 32 whose flanged lower end rests on the closure block 27 and is fixed thereto. The motor-stator 30 may have conventional field windings. The motor-rotor 31 comprises a plurality of rotor bars 33 fixed to the interior surface of the hollow shaft.

The diaphragm 25 is principally a protective measure, since it prevents the gas being handled by the pump from coming into contact with the motor-stator. However, in order to reduce electrical losses, the diaphragm 25 is preferably made of a metal having a high electrical resistance, such as Monel, or of a suitable non-conductor. The central hollow column 32 supporting the motor-stator 30 also provides support for the disc 26 and thus for the diaphragm 25. In some cases, for example where the pumped fluid is non-corrosive, the diaphragm 25 may be omitted.

In order to cool the stator windings, a suitable coolant such as an oil may be flowed into the central enclosure 23 by means of the conduit 34 through the base block 27. The coolant flows upward, surrounding the stator windings, and thence into openings 35 in the upper end of the central hollow column 32. The coolant flows through the central channel 36 in the hollow column 32 and thence outward through conduit 37.

The rotor receives its principal vertical support from the thrust bearing 15 and is guided laterally by the journal bearings 38 and 55. The bearings 38 and 55 are situated adjacent each other and each comprises a stationary bearing member 39 having an inner plain bearing surface and a rotatable bearing member 40 having a confronting cylindrical surface formed in accordance with the present invention. These journal bearings support the radial thrust of the rotor 11. It is seen here that the shaft 12 is formed with external bearing surfaces and the shaft itself acts as the journals of the two journal bearings.

Referring now particularly to FIG. 2, there is shown in elevation the exterior surface of the shaft 12 having the two adjacent journal surfaces 46 and 47 formed in accordance with this invention, corresponding to the bearings 38 and 55 respectively. As shown, the shaft 12 is rotating in a counterclockwise direction when viewed from above the shaft. Each of the bearing surfaces 46 and 47 is substantially identical to the other so that the remarks made with respect to the bearing surface 46 will apply equally to the bearing surface 47.

The bearing surface 46 is divided into an upper portion 56 and a lower portion 57. The lower portion 57 is substantially a mirror image of the portion 56 with the mirror at the center of an annular peripheral band 53 encircling the bearing area 46 at its middle. In each of the upper portion 56 and the lower portion 57 of the bearing surface of the journal, a plurality of elongated depressed surfaces or recesses 42 and 42a respectively are arranged obliquely with respect to one another. The longitudinal edges of each depressed surface are parallel and the recesses 42 and 42a in portions 56 and 57 respectively diverge from their proximal ends at the central band 53 in the direction of rotation of the shaft. The distal ends of the depressed surfaces then lead the proximal ends with respect to the rotation of the shaft.

The depressions 42 may be formed by etching and are generally of the order of 0.0025 inches in depth when a gas is used as lubricant. Each depressed surface 42 is surrounded by the non-recessed portions 51 of the journal surface, the central band 53 being in the same surface as the non-recessed portions 51. As shown in FIG. 3 wherein the proportions are exaggerated depressions 42 form a step-like rise 43 with the non-recessed portions 51 of the bearing surface and with the central band 53. It will be seen then, since the lower portion 57 of the surface 46 is a mirror image of the upper portion 56, that the non-recessed surfaces 51 form a herringbone pattern covering the entire area 46 of the journal, the central rib of the herringbone pattern being the central band 53. It will also be seen that each of the depressed surfaces 42 has directly below it a corresponding depressed surface 42a in the lower portion 57 of the journal area. Each pair of depressions 42 and 42a, one in the upper portion 56, the other its mirror image in the lower portion 57, will be referred to hereinafter as a bearing element.

In the embodiment shown in FIG. 2, the horizontal projection of each bearing element subtends a radial angle of approximately 60°, the projection being taken between the most remote corners of the recesses 42. That is, the horizontal projection of each bearing element is approximately one-sixth the perimeter of the journal. Although this radial angle may have any value greater than zero and less than 360°, it is preferred that its value be less than 90° or one-fourth the perimeter of the journal.

The ratio of the area of the journal surface depressed to that which is not depressed is preferably between 0.25 and 2.0 although the value of this ratio depends largely on the desired characteristics of the bearing, particularly with respect to the load carried by the bearing and the running speed at which no appreciable whip is permissible.

The angle between the edges of the recesses and the central band 53 affects both the load-carrying capacity of the rotor and the tendency of the rotor to whip. As this angle is made larger, that is, as the longitudinal edges of the depressions become more nearly perpendicular to the central band 53, the tendency for the journal to whip is decreased. However, as this is done, the load-carrying capacity of the bearing is also decreased. Thus the two effects must be balanced against each other in designing a bearing of this type. It is necessary, however, that the edge of each depression trailing with respect to the direction of rotation be oblique to the central band 53 and to the axis of rotation. When fabricated in this way, the trailing step-like rise 43 is employed to cause the lubricant to flow longitudinally through the depression while at the same time the trailing rise 43 impedes the lateral flow of the lubricant out of the depression. The most desirable bearing is fabricated as shown in FIG. 2 with each bearing element consisting of a pair of elongated depressed surfaces obliquely arranged with respect to one another to diverge from one another in the direction of rotation. In this way rotation of the journal causes a flow of lubricant along the depressed surfaces from their distal ends towards their proximal ends.

It may be seen from the preceding description that the journal of each bearing has a plurality of bearing elements in spaced relation around the periphery of the journal, each element being formed by a pair of relatively shallowly depressed surfaces such as 42 and 42a with each depressed surface in an element being situated directly below and diverging from the other along the length of the journal surface. This in effect forms a herringbone pattern. It will be seen further that the journal surfaces 46 and 47 are substantially identical.

In order to reduce the starting torque in a compressor of this type, a gas under pressure may be admitted to the central well 13 by means of the conduit 50. The pressure of this gas is sufficient just to lift the rotor and the gas is supplied only until the thrust bearing 15 is rotating at a sufficiently high speed to provide sufficient lubricant pressure to support the rotor. Gas supplied for this purpose may be either an inert gas or a portion of the gas being handled by the compressor.

As the operation of the compressor unit described above is started, the auxiliary gas under pressure is initially supplied to the well 13 through the conduit 50. The pressure of this gas lifts the rotor to separate the thrust bearing surfaces 18 and 19. As the rotor accelerates, gas is drawn in through the central inlet 20 into the pump impeller and this gas is pumped outward through the passage 24 by the impeller vanes. A portion of this gas surrounds the periphery of the thrust bearing 15 and is drawn in between the bearing surfaces by the rotation of the thrust collar 16 over the thrust plate 17. This gas is pumped into the well 13 by the action of the thrust bearing and surrounds the rotor and the enclosure 23. After the thrust bearing develops sufficient pressure to support the rotor, the auxiliary gas supply is shut off. As the pressure of the gas in the well is increased, a point is reached at which no further gas is pumped into the well so that all of the gas being pumped by the thrust bearing surfaces leaks out between the thrust plate and the thrust collar. There is then established a pressure drop across the thrust bearing with the maximum pressure being in the well, that is at the inner periphery of the annular thrust plate 17.

The rotation of the shaft causes the gas in the well at the outer ends of the bearing to flow into and through the depressions 42 and 42a. The trailing edges of the pair of depressions in a bearing element, being obliquely arranged with respect to one another to diverge in the direction of rotation, cause a portion of the lubricant in the well to flow longitudinally along the depressions from their distal ends to their proximal ends. Thus each bearing element serves to distribute the lubricant along the length of the bearing area. The flow of the lubricant from the depressions is impeded by edges of the non-recessed area, that is, the step-like rises 43 trailing with respect to the flow of lubricant. This causes the gas flowing through the recesses to be compressed between the depressed surfaces 42 and the plain bearing surface 41 of the bearing sleeve. Thus the pressure of the gas in each depression 42 increases toward the trailing edge thereof, and the pressure of the gas is at its maximum at the trailing edges of the depressions. In this manner, the journal surface also acts as a pump to distribute the gaseous lubricant and to increase its pressure above the ambient pressure in the well 13 in a definite pattern around the periphery of the journal. It should be pointed out here that the depth of the depressions should never be large enough to permit the pressure of the lubricant to approach closely the value of the ambient pressure of the lubricant in the well. This would reduce the load-carrying capacity of the bearing markedly. In general, it is desirable that the depth of the depressed surfaces be of the order of magnitude of the machined radial clearance of the journal bearing.

The characteristics of a typical embodiment of the invention are shown in FIGS. 4 and 5. In this embodiment two adjacent bearings were provided as described with each journal being 5.3 inches in diameter by 4.625 inches in length. The recessed areas were about 0.0024 inches in depth, the horizontal projection of each pair of recessed areas or bearing elements subtended a radial angle of about 60°. The journal bearing area was etched to form 24 bearing elements or pairs of recessed surfaces so that the recesses occupied about 20% more area than the non-recessed portions. The machined diametral clearance of the bearing was 0.0063 inches and at this clearance the bearing had a threshold whip speed at no load of about 7,000 r.p.m. However, when the maximum diametral clearance was reduced to about 0.005 inches, there was no whipping of the journal at 11,000 r.p.m.

In FIG. 4, the clearance-load characteristics of the shaft just described are shown. The shaft was run with air lubrication at approximately atmospheric pressure, the curve A being made at 7,000 r.p.m. and the curve B at 6,300 r.p.m. The clearance indicated in the curve is the clearance at the point where the journal approaches the confronting surface of the bearing sleeve most closely, that is, at the point of minimum clearance. As the load on the rotor is increased the minimum clearance continually decreases with the higher load being carried at the higher speed of rotation at any particular minimum clearance. As indicated in the figure, even at a load on the bearing in excess of 50 pounds with a speed of rotation of 6,300 r.p.m., the clearance is around 0.001 inches. At 7,000 r.p.m. and a load of about 55 pounds the clearance is in excess of 0.0012 inches. As the load on the bearing is decreased at any speed below the no-load threshold speed, the minimum clearance approaches the machined clearance of the bearing.

In FIG. 5, there are shown three curves demonstrating the effect of the ambient pressure of the lubricant, in this case air, on the minimum clearance as defined in the preceding paragraph. Each of the curves was made with a different load on the same shaft, the curve A with a load of 13.32 pounds, B with 22.94 pounds and C with 32.38 pounds. As shown, the minimum clearance increases rapidly at each load up to a pressure of around 3 to 4 pounds per square inch absolute. Above this pressure the rate of increase of the clearance declines sharply so that the ambient pressure has virtually no effect on the minimum clearance once the ambient pressure exceeds about 4 pounds per square inch absolute. This indicates that the bearing described above should preferably be run with the ambient lubricant pressure in excess of about 4 pounds per square inch absolute. The effect of reducing the minimum clearance caused by increasing the load is also evident in FIG. 4.

Although the present invention has been described with reference to the use of a gas as lubricant it will be evident that the invention is also useful where liquid lubricants are employed. In the latter instance the threshold speed of rotation will be considerably increased so that the bearings may be used at even higher speeds with liquid than with gaseous lubricants without whipping. In addition, with liquid lubricants the load-carrying capacity of the bearing is markedly increased at any particular speed of rotation. It will be seen also that although the present invention has been described with reference to vertical bearings it may also be used in a bearing having a horizontal axis of rotation with either gaseous or liquid lubricants.

In the description of this invention the bearing elements, that is the pairs of recessed surfaces, have been provided on the rotating bearing member of journal. The bearing elements may also be formed in the stationary bearing member or bearing sleeve with the journal having a plain bearing surface. When this is done, however, the threshold whip speed of the bearing is reduced.

Other alternatives will be apparent to those skilled in the art.

Since many embodiments might be made of the present invention and since many changes might be made in the embodiment described, it is to be understood that the foregoing description is to be interpreted as illustrative only and not in a limiting sense.

We claim:

1. An improved journal bearing comprising in combination a non-rotatable cylindrical bearing member having a first bearing surface, a rotatable cylindrical bearing member having a confronting second bearing surface having a plurality of bearing elements, a source of lubricant adjacent said bearing elements for supplying lubricant thereto, each bearing element consisting of a pair of elongated relatively shallowly depressed surfaces lying in a cylindrical surface co-axial with the non-depressed surface and diverging from one another in the direction of rotation and obliquely arranged with respect to the axis of rotation of said rotatable member to cause a flow of lubricant longitudinally along said depressed surfaces from their distal ends toward their proximal ends as said bearing members are rotated relative to one another, each depressed surface subtending a radial angle of less than 360°, and means for rotating said rotatable bearing member to cause the lubricant to flow across and along said depressed surfaces, the flow of lubricant being impeded by the non-depressed portions of said second bearing surface to cause an increase in the lubricant pressure.

2. An improved journal bearing comprising in combination a hollow non-rotatable cylindrical bearing member having a plain inner bearing surface, a rotatable cylindrical bearing member with a confronting outer bearing surface having a plurality of bearing elements, a source of lubricant adjacent said bearing elements for supplying lubricant thereto, each bearing element consisting of a pair of elongated relatively shallowly depressed bearing surfaces lying in a cylindrical surface co-axial with the non-depressed surface and diverging from one another in the direction of rotation of said rotatable bearing member and obliquely arranged with respect to the axis of rotation of said rotatable member in a herringbone pattern to cause a flow of lubricant longitudinally along said depressed surfaces from their distal ends toward their proximal ends as said rotatable bearing member is rotated, each depressed surface subtending a radial angle of less than 360°, and means for rotating said rotatable bearing member to cause the lubricant to flow across and along said depressed surfaces, the flow of lubricant being impeded by the non-depressed portions of said outer bearing surface to cause an increase in the lubricant pressure.

3. An improved journal bearing comprising in combination a hollow non-rotatable cylindrical bearing member having a plain inner bearing surface, a rotatable cylindrical bearing member having a confronting outer bearing surface having a plurality of bearing elements, a source of lubricant adjacent said bearing elements for supplying lubricant thereto, each bearing element consisting of a pair of elongated relatively shallowly depressed surfaces lying in a cylindrical surface co-axial with the non-depressed surface and diverging from one another in the direction of rotation of said rotatable bearing member and arranged obliquely with respect to the axis of rotation of said rotatable member to cause a flow of lubricant longitudinally along said depressed surfaces from their distal ends toward their proximal ends as said rotatable bearing member is rotated, each said depressed surface having a projection in a plane perpendicular to the axis of rotation of said rotatable member subtending a radial angle of less than 360°, the ratio of the area of said outer bearing surface depressed to the area not depressed being in the range 0.25 to 2.0, and means for rotating said rotatable bearing member to cause the lubricant to flow across and along said depressed surfaces, the flow of lubricant being impeded by the non-depressed portions of said outer bearing surface to cause an increase in the lubricant pressure.

4. The improved journal bearing as in claim 3 wherein the projection of each bearing element in a plane perpendicular to the axis of rotation of said rotatable member subtends a radial angle of less than 90°.

5. An improved journal bearing comprising in combination a hollow non-rotatable cylindrical bearing member having a plain inner bearing surface, a rotatable cylindrical bearing member having a confronting outer bearing surface provided with a plurality of bearing elements, a source of lubricant adjacent said bearing elements for supplying lubricant thereto, each bearing element consisting of a pair of relatively shallowly depressed surfaces lying in a cylindrical surface co-axial with the non-depressed surface and diverging from one another in the direction of rotation of said rotatable member and arranged obliquely with respect to the axis of rotation of said rotatable member in a herringbone pattern to cause a flow of lubricant longitudinally along said depressed surfaces from their distal ends toward their proximal ends when said rotatable bearing member is rotated, the total area of the depressed surfaces being between 33 and 60% of the area of said outer bearing surface, each said depressed surface subtending a radial angle of less than 360° with the depth of said depressed surfaces being of the same order of magnitude as the radial clearance between said rotatable and non-rotatable bearing members, and means for rotating said rotatable bearing member to cause the lubricant to flow across and along said depressed surfaces, the flow of lubricant being impeded by the non-depressed portions of said outer bearing surface to cause an increase in the lubricant pressure.

* * * * *